United States Patent [19]

Weidig

[11] Patent Number: 4,861,914
[45] Date of Patent: Aug. 29, 1989

[54] DISCOLORATION INHIBITORS FOR AROMATIC AMINES

[75] Inventor: Charles F. Weidig, Baton Rouge, La.

[73] Assignee: Ethyl Corporation, Richmond, Va.

[21] Appl. No.: 48,261

[22] Filed: May 11, 1987

Related U.S. Application Data

[63] Continuation-in-part of Ser. No. 776,674, Sep. 16, 1985, abandoned.

[51] Int. Cl.$^4$ ..................... C07C 85/26; C07C 87/58; C07C 87/56
[52] U.S. Cl. ........................................... 564/7
[58] Field of Search ........................................... 564/7

[56] References Cited

U.S. PATENT DOCUMENTS

| | | | |
|---|---|---|---|
| 2,410,829 | 11/1946 | Luten | 564/7 X |
| 2,410,847 | 11/1946 | Walters | 564/7 X |
| 2,411,307 | 11/1946 | Walters | 564/7 |
| 2,552,466 | 5/1951 | Sweeney | 564/7 X |
| 2,637,636 | 5/1953 | Walters | 564/7 X |
| 3,222,310 | 12/1965 | Hinckley | 260/29.6 |
| 4,306,985 | 12/1981 | Walters | 252/51.5 R |

Primary Examiner—Charles F. Warren
Assistant Examiner—Carolyn S. Greason
Attorney, Agent, or Firm—Joseph D. Odenweller

[57] ABSTRACT

Substituted aromatic amines or mixtures thereof containing a discoloration inhibiting amount of a substituted phenol having the structure:

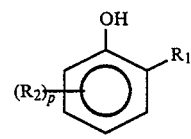

or mixtures of such substituted phenols wherein $R_1$ and $R_2$ are independently selected alkyl, cycloalkyl, aryl, aralkyl, or alkaryl and p is 0 to 4.

A method and composition are provided for inhibiting discoloration of alkylated aromatic amines and diamines. A minor portion of the substituted phenol is combined with a fresh, water white substituted aromatic amine of structure

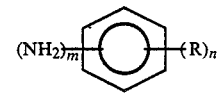

or mixtures thereof wherein m is 1 or 2, n is 1 to 5, m+n is not greater than 6, and the R are independently selected alkyl, cycloalkyl, aryl, aralkyl or alkaryl, said amine being subject to gradual discoloration, and a minor amount by weight of a substituted phenol or mixture of substituted phenols to inhibit color degradation.

6 Claims, No Drawings

DISCOLORATION INHIBITORS FOR AROMATIC AMINES

This application is a continuation-in-part of application Ser. No. 776,674 filed Sept. 16, 1985.

BACKGROUND OF THE INVENTION

The present invention is related to aromatic amines and discoloration therein as well as the use of discoloration inhibitors in aromatic amines.

Aromatic amines which have been freshly distilled are "water white". By water white, I mean that aromatic amines are clear, without sediment or precipitate or bodies in suspension. I also mean that they are colorless.

I have found that aromatic amines such as alkylated anilines and alkylated aromatic diamines are subject to discoloration upon standing or exposure to air or oxygen. The normally water white substituted aromatic amines, upon standing, tend to turn to a straw or dust color and eventually will turn to a totally black color which is unsuitable for further processing of the alkylated aromatic amine. Typically, the substituted aromatic amines are used as intermediates in the preparation of polymers such as polyurethanes, insecticides, herbicides, and other products. Accordingly, there is a need to provide a method and composition for stabilizing the color of the alkylated aromatic amines.

SUMMARY OF THE INVENTION

The present invention is directed to providing a composition and method for inhibiting discoloration in substituted aromatic amines. I have discovered that incorporation of small amounts of certain compounds is effective to inhibit the discoloration of substituted aromatic amines over a period of time which is greatly extended from the normal discoloration period found with the unprotected substituted aromatic amines.

The present invention is a composition of matter comprising a major amount of weight of ring substituted aromatic amine or mixtures thereof and a discoloration inhibiting amount of certain substituted phenols or mixtures thereof. The substituted aromatic amines are protected against discoloration by providing a small amount of discoloration inhibitor therein.

DESCRIPTION OF THE PREFERRED EMBODIMENTS

A preferred embodiment of the invention is a composition of matter consisting essentially of a major amount by weight of a substituted aromatic amine having the structure I:

(I)

or mixtures of 2 or more of said aromatic amines wherein m is 1 or 2, n is 1 to 5, and m+n is not greater than 6, the R is independently selected from alkyl, cycloalkyl, aryl, aralkyl, or alkaryl, said aromatic amine being subject to gradual discoloration, and a minor amount by weight of a substituted phenol having the structure II:

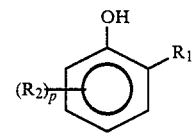
(II)

wherein $R_1$ and $R_2$ are independently selected alkyl, cycloalkyl, aryl, aralkyl, or alkaryl and p is 0 to 4.

The present invention is also a method of inhibiting gradual discoloration in high purity alkylated aromatic amines selected from ortho-alkylanilines, 2,6-dialkylanilines, and trialkyl-diaminobenzenes, said method comprising adding to said amine a discoloration-inhibiting amount of a phenol of structure II:

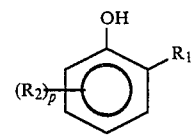
(II)

or mixtures of such phenols wherein $R_1$ and $R_2$ are independently selected alkyl, cycloalkyl, aryl, aralkyl, or alkaryl and p is 0 to 4.

The substituents of both the aromatic amines and phenols of the compositions of the invention may be alkyl, cycloalkyl, aryl, aralkyl, or alkaryl. Such groups include methyl, ethyl, isopropyl, sec-butyl, tert-butyl, pentyl, heptyl, nonyl, cyclopentyl, cyclohexyl, phenyl, alpha-methyl-benzyl, benzyl, methylphenyl, butylphenyl, and the like.

The substituted aromatic amines of the invention include alkylated anilines, and alkylated aromatic diamines. A first preferred class of compounds are the alkylated anilines including the following compounds:
ortho-toluidine;
ortho-ethylaniline;
ortho-isopropylaniline;
ortho-tert-butylaniline;
2,4-di-tert-butylaniline;
2,4-diethylaniline;
2-methyl-4-ethylaniline;
2-ethyl-4-sec-butylaniline;
2,6-dimethylaniline;
2,6-diethylaniline;
2-methy-6-ethylaniline;
2,6-diisopropylaniline;
2,6-di-tert-butylaniline;
2-ethyl-6-sec-butylaniline;
2,4,6-triethylaniline;
2-methyl-6-tert-butylaniline;
and the like.

Preferably the substituted aromatic amines of structure I are alkylated anilines wherein m=1, n=2, and R is an alkyl of 1 to 4 carbon atoms. A preferred sub-class are the 2,6-dialkylanilines such as 2-methyl-6-ethylaniline.

Another preferred sub-class are those substituted aromatic amines where n=1, m=1, and the R are 1 to 4 carbon alkyls; more preferably, ortho-alkylanilines such as orthoethylaniline.

Another preferred group of alkylated aromatic amines which are protected according to the composition and method of the invention include the alkylated aromatic diamines such as:
2,4-diaminotoluene;

2,6-diaminotoluene;
2,4-diaminoethylbenzene;
2,6-diaminoethylbenzene;
2,4-diamino-3,5-diethyltoluene;
2,6-diamino-3,5-diethyltoluene;
1,3,5-triethyl-2,4-diaminobenzene;
and the like including mixtures thereof.

The substituted aromatic amines of the invention may be protected by incorporating therein a coloration inhibiting amount of a protective compound of the invention. The protective compounds may be added to freshly distilled substituted aromatic amine or substituted aromatic amines which are otherwise protected from exposure to air or oxygen so as to maintain the water white color and clarity of the substituted aromatic amine.

I have found that alkylated aromatic amines with a greater degree of substitution receive a higher degree of benefit from the invention. For example, 2,6-diethylaniline is better protected from discoloration than is ortho-ethylaniline.

In a preferred embodiment of the invention, the particular discoloration inhibitor is added in a small amount to the substituted aromatic amine and the substituted aromatic amine is thereafter distilled. Depending upon the respective boiling points of the discoloration inhibitor and the substituted aromatic amine, some of the inhibitor may be carried over with the amine during the distillation to provide continued protection. Also, additional discoloration inhibitor may be added to the substituted aromatic amine after it has been distilled in the presence of the same or a different discoloration inhibitor.

The discoloration or color degradation protected against is the slow gradual deterioration of the water white color normally found in pure substituted aromatic amine rather than, for example, that discoloration caused by sudden combustion or strong chemical reaction. Of course, the discoloration inhibitors are effective whether such conditions exist or the substituted aromatic amine is merely subject to extended storage or exposure to air.

The alkylated aromatic amines are considered to be of high purity when they are substantially unmixed with other substances although they may be fixed with each other. High purity alkylated aromatic amines are water white (especially after distillation) or nearly so, such as a light tan or straw color. Incorporation of the inhibitors of the invention is helpful with an alkylated aromatic amine at any color stage. That is, while the inhibitor will inhibit a water white sample from turning light yellow, it will also inhibit a yellow sample from turning orange or dark red.

Generally, the substituted aromatic amines of the invention may be represented by the following structure I:

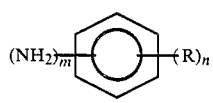

(I)

where m is 1 or 2, n is 1 to 5, m+n is not greater than 6, and R is independently selected alkyl, cycloalkyl, aryl, aralkyl, or alkaryl.

To a major amount by weight of the substituted aromatic amine of the invention is added a discoloration inhibiting amount of a protective compound of the invention.

The discoloration inhibitors of the invention include the substituted phenols having the structure II:

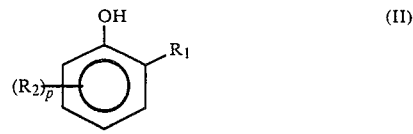

and mixtures thereof wherein $R_1$ and $R_2$ are independently selected from alkyl, cycloalkyl, aryl, aralkyl, or alkaryl and p is 0 to 4. Preferably, these substituted phenols are ortho-substituted phenols or 2,6-disubstituted phenols. A preferred class of color inhibiting phenols of the invention are the 2,6-dialkylphenols and 2,4,6-trialkylphenols. Thus, the preferred color inhibitor compounds of the invention in this class, include the following compounds:
2,6-di-tert-butylphenol;
2,4,6-tri-tert-butylphenol;
2,4,6-trimethylphenol;
2,6-di-tert-butyl-4-methylphenol;
2,6-dimethylphenol;
2,6-diisopropylphenol;
2-methyl-6-ethylphenol;
2-ethyl-6-sec-butylphenol;
2,6-diethylphenol;
and the like. Another preferred inhibitor is 2,6-dibenzylphenol.

The preferred substituents on the aromatic amines and phenols of the invention are alkyl. The alklyls are preferably 1 to 4 carbon alkyls including methyl, ethyl, sec-butyl, tert-butyl, and isopropyl. The most preferred alkylated phenol is 2,6-di-tert-butyl-4-methyl-phenol.

A broad range of amount of discoloration inhibiting compound is usable in the substituted aromatic amines subject to protection according to the invention. The range includes an amount small enough to provide some protection to the substituted aromatic amine but not so large as to inhibit or otherwise interfere with the intended use of the substituted aromatic amine. A useful range for the inhibitor is 0.001 weight percent of the substituted aromatic amine to 5.0 weight percent of the substituted aromatic amine. A more preferred range is 0.01 to 2.0 weight percent. A still more preferred range for the amount of discoloration inhibiting compound is about 0.01 to 0.2 weight percent based on the weight of said amine.

The solubility of the discoloration inhibiting compounds in the substituted aromatic amines of the invention varies with the substituted aromatic amine and additive discoloration inhibitor. For example, 2,6-di-tert-butyl-4-methylphenol is about 40% by weight soluble in 2-methyl-6-ethylaniline. Other substituted phenols in other substituted aromatic amines may vary somewhat from this combination. Generally, the phenolic discoloration inhibitors are at least about 40 weight percent soluble in the substituted aromatic amines of the invention. It may be desirable in some cases to heat the substituted aromatic amine somewhat in order to dissolve the discoloration inhibiting phenol in the substituted aromatic amine but this is not necessary if time is not a factor.

Numerous experiments have served to confirm the utility and workability of the invention. Typically, water white (clear and colorless) 2-methyl-6-ethylaniline was obtained by distillation. In the absence of an inhibitor, color bodies tend to develop rapidly, usually within one week. The addition of about 0.1 weight percent, 2,6-di-tert-butyl-4-methylphenol (BHT) to the water white 2-methyl-6-ethylaniline was found to be very effective in preventing color formation. In one example, the 2-methyl-6-ethylaniline protected with 0.108% BHT ("butylated hydroxy toluene", mainly 2,6-di-tert-butyl-p-cresol) was still clear and colorless, that is water white, after six months. Typically, an unprotected solution of 2-methyl-6-ethylaniline would begin to become off-colored or straw colored within one week. I found that BHT was effective in preventing discoloration even at 0.01 weight percent.

A better understanding of the invention will be had by review of the following examples.

EXAMPLE 1

A large portion of 2-methyl-6-ethylaniline was distilled through an Oldershaw distillation column (20 trays) to provide water white material of more than 99.9% purity. To a 49.95 gram portion of the distilled aniline was added 0.05 grams of BHT to give a 0.1 weight percent solution. The sample, in glassware, was placed in an oven at 50° C. for 1 hour to assure dissolution of the additive. A controlled sample of the distilled aniline was similarly treated without an additive. After being in the oven for 1 hour, both samples were water white. However, after 60 weeks, the 50 gram sample containing the BHT was only light yellow in color whereas the unprotected sample was orange.

A similar study was conducted with additional 50 gram samples of freshly distilled 2-methyl-6-ethylaniline containing discoloration inhibiting portions of BHT. Four 50 gram samples containing varying amounts of BHT along with a control sample containing no BHT were stored in a closed container at room temperature and observed after extended periods of time. Similarly, four additional samples and another control sample were stored at 43° C. in an air circulated oven. All of the initial samples were water white. Table I below is a summary of the observation of color in the samples after an extended period of time. The color degradation ranged from the initial water white to light yellow to orange to dark red. All of the sample were initially water white.

TABLE I

| WEIGHT PERCENT BHT | DISCOLORATION IN 2-METHYL-6-ETHYLANILINE | | |
|---|---|---|---|
| | ROOM TEMPERATURE | | 43° C. |
| | 10 WEEKS | 14 & 48 WEEKS | 10 WEEKS |
| 0.1 | light yellow | light yellow | dark red |
| 0.05 | light yellow | light yellow | orange |
| 0.0025 | light yellow | light yellow | dark red |
| 0.010 | light yellow | light yellow | orange |
| none | orange | orange | dark red |

The above study was repeated and similar results were obtained except that none of the samples turned dark red at 43° C. Rather, an orange color was observed. Two additional room temperature studies were conducted and the samples were observed after 9 weeks and 43 weeks with the same results reported for the room temperature portion of Table I.

EXAMPLE 2

In the same fashion as Example 1, samples of 2,6-diethylaniline were prepared and stored. In an initial test, a sample with no discoloration inhibitor turned dark red after 12 weeks storage at 43° C. Two comparison samples containing 0.1 and 0.05 weight percent BHT were only orange after 12 weeks storage at 43° C. In the same manner as in Example 1, four 50 gram supplies containing varying amounts of BHT and a fifth control sample were stored at room temperature and their color was recorded after an extended period of time. The results of this study are given in Table II below.

TABLE II

| WEIGHT PERCENT BHT | DISCOLORATION IN 2,6-DIETHYLANILINE | |
|---|---|---|
| | ROOM TEMPERATURE | |
| | 10 WEEKS | 48 WEEKS |
| 0.1 | light yellow | light yellow |
| 0.05 | light yellow | light yellow |
| 0.025 | light yellow | orange |
| 0.010 | orange | orange |
| none | orange | dark red |

At the same time, five samples containing the same decreasing amounts of BHT were stored at 43° C. and after 10 weeks all of the samples were observed to be orange in color.

The study of Table II above and the associated 43° C. evaluation was repeated with five initially water white samples of varying amounts of BHT (including the control) and similar results were observed after 10 and 47 weeks.

EXAMPLE 3

In the same manner as Examples 1 and 2, a storage test was conducted with ortho-ethylaniline containing various amounts of BHT and comparisons were made to a control containing no BHT. The initial samples of ortho-ethylaniline were light yellow in color and the results of the study are given in Table III below.

TABLE III

| WEIGHT PERCENT BHT | DISCOLORATION IN ORTHO-ETHYLANILINE | | |
|---|---|---|---|
| | ROOM TEMPERATURE | | 43° C. |
| | 9 WEEKS | 47 WEEKS | 9 WEEKS |
| 0.1 | light yellow | orange | orange |
| 0.05 | orange | orange | orange |
| 0.025 | light yellow | orange | dark red |
| 0.010 | light yellow | orange | orange |
| none | dark red | dark red | dark red |

The above study was repeated with similar results as shown in Table IV on the following page.

TABLE IV

| WEIGHT PERCENT BHT | DISCOLORATION IN ORTHO-ETHYLANILINE | | |
|---|---|---|---|
| | ROOM TEMPERATURE | | 43° C. |
| | 9 WEEKS | 47 WEEKS | 9 WEEKS |
| 0.1 | orange | orange | dark red |
| 0.05 | orange | orange | orange |
| 0.025 | orange | orange | orange |
| 0.010 | orange | orange | orange |
| none | orange | dark red | orange |

Further storage tests were run in which the substituted phenol was incorporated in the substituted aromatic amine without heating. The test samples were made by dissolving 0.2883 g of BHT in 300 ml freshly distilled 2-methyl-6-ethylaniline to give a 0.1 wt. percent BHT master blend. Portions of the master blend were diluted with freshly distilled 2-methyl-6-ethylanilin to give a series of test samples with various BHT concentrations. All samples were water white at the start of the storage test. The following Table V shows the color developed during the test.

TABLE V

| WEIGHT PERCENT BHT | STORAGE AT ROOM TEMPERATURE | | |
|---|---|---|---|
|  | 4 WEEKS | 9 WEEKS | 42 WEEKS |
| 0.1 | LY | LY | LY |
| 0.05 | LY | LY | LY |
| 0.025 | LY | LY | LY |
| 0.01 | LY | LY | LY |
| none | OR | OR | OR |

Only the samples containing the substituted phenol remained light yellow (LY).

EXAMPLE 4

In a distillation vessel was placed 245 g of a mixture of about 76 wt % 2,4-diamino-3,5-diethyltoluene 18 wt % 2,6-diamino-3,5-diethyltoluene and 3 wt % monoethyl diaminotoluene. To this was added 5 g BHT. This mixture was distilled under vacuum at 50 mm Hg to an overhead temperature of 151° C. (pot temperature 190° C.). The distillate (210 g) was water white and analyzed by GC 82%, 2,4-diamino-3,5-diethyltoluene; 11.71% 2,6-di-ethyltoluene; 3.4% monoethyl toluenediamine and 2.09% BHT. The distillate was stored in a closed flask containing air. Inspection after 2 years 2 months showed it to yellow-gold in color.

I claim:

1. A composition of matter consisting essentially of a major amount by weight of a substituted aromatic amine selected from the group consisting of 2-methyl-6-ethylaniline, 2,6-diethylaniline, ortho-ethylaniline and mixtures of 2 or more of said aromatic amines, said aromatic amine being subject to gradual discoloration, and a minor amount by weight of 2,6-di-tert-butyl-4-methylphenol whereby said phenol inhibits discoloration of said aromatic amine.

2. The composition of claim 1 wherein said minor amount by weight of said 2,6-di-tert-butyl-4-methylphenol is about 0.01 to 0.2 weight percent based on the weight of said aromatic amine.

3. A composition of matter consisting essentially of a major amount by weight of a substituted aromatic amine selected from the group consisting of 2,4-diamino-3,5-diethyltoluene, 2,6-diamino-3,5-diethyltoluene and mixtures thereof, said aromatic amine being subject to gradual discoloration, and a minor amount by weight of 2,6-di-tert-butyl-4-methylphenol whereby said phenol inhibits discoloration of said aromatic amine.

4. The composition of claim 3 wherein said minor amount by weight of said 2,6-di-tert-butyl-4-methylphenol is about 0.01 to 0.2 weight percent based on the weight of said aromatic amine.

5. A method of inhibiting gradual discoloration of a substituted aromatic amine selected from the group consisting of 2-methyl-6-ethylaniline, 2,6-diethylaniline, ortho-ethylaniline and mixtures of 2 or more of said aromatic amines, said aromatic amine being subject to gradual discoloration, said method comprising adding to said aromatic amine a discoloration inhibiting amount of 2,6-di-tert-butyl-4-methylphenol and distilling said aromatic amine containing said 2,6-di-tert-butyl-4-methylphenol.

6. A method of inhibiting gradual discoloration of a substituted aromatic amine selected from the group consisting of 2,4-diamino-3,5-diethyltoluene, 2,6-diamino-3,5-diethyltoluene, and mixtures thereof, said aromatic amine being subject to gradual discoloration, said method comprising adding to said aromatic amine a discoloration inhibiting amount of 2,6-di-tert-butyl-4-methylphenol and distilling said aromatic amine containing said 2,6-di-tert-butyl-4-methylphenol.

* * * * *